(12) United States Patent
Jang et al.

(10) Patent No.: US 9,079,055 B2
(45) Date of Patent: Jul. 14, 2015

(54) METHOD OF REMOVING ASBESTOS FROM ASBESTOS-CONTAINING MATERIALS BY 99% THROUGH LOW TEMPERATURE HEAT TREATMENT

(71) Applicant: KOREA INSTITUTE OF GEOSCIENCE AND MINERAL RESOURCES, Daejeon (KR)

(72) Inventors: Young-Nam Jang, Daejeon (KR); Soo-Chun Chae, Seoul (KR); Myung-Kyu Lee, Daejeon (KR); Hye-In Won, Cheongju-si (KR); Kyoung-Won Ryu, Daejeon (KR)

(73) Assignee: KOREA INSTITUTE OF GEOSCIENCE AND MINERAL RESOURCES, Deajeon (KR)

( * ) Notice: Subject to any disclaimer, the term of this patent is extended or adjusted under 35 U.S.C. 154(b) by 0 days.

(21) Appl. No.: 14/189,519

(22) Filed: Feb. 25, 2014

(65) Prior Publication Data

US 2014/0243575 A1 Aug. 28, 2014

(30) Foreign Application Priority Data

Feb. 26, 2013 (KR) .................. 10-2013-0020445
Mar. 25, 2013 (KR) .................. 10-2013-0031465
Jan. 28, 2014 (KR) .................. 10-2014-0010260

(51) Int. Cl.
*A62D 3/36* (2007.01)
*B09B 3/00* (2006.01)
*A62D 101/41* (2007.01)

(52) U.S. Cl.
CPC .............. *A62D 3/36* (2013.01); *B09B 3/0066* (2013.01); *A62D 2101/41* (2013.01)

(58) Field of Classification Search
CPC .............. A62D 3/36; A62D 3/30; A62D 3/40
USPC .................. 588/411, 318, 313, 901
See application file for complete search history.

(56) References Cited

U.S. PATENT DOCUMENTS

2006/0106272 A1    5/2006    Brown

FOREIGN PATENT DOCUMENTS

| JP | 3066976 | 7/2000 |
| JP | 2007-222698 A | 9/2007 |
| JP | 2008-272543 A | 11/2008 |
| KR | 10-2012-0002676 | 1/2012 |
| KR | 10-2012-0024103 | 3/2012 |
| KR | 10-2012-0110425 | 10/2012 |
| KR | 10-1326741 B1 | 11/2013 |
| WO | WO 2006/052859 A2 | 5/2006 |

OTHER PUBLICATIONS

Extended European Search Report for 14155604.3 mailed by the European Patent Office on Aug. 1, 2014, 7 pages.
Rozalen et al., "Oxalate-Promoted Dissolution of Chrysotile", Introduction, revista de la sociedad espanola de mineralogia, issue No. 16, Jun. 2012, 2 pages.
Anastasiadou, et al. "An Innovative Technology for the Detoxification of Asbestos", Crete 2012, 3rd International Conference on Industrial and Hazardous Waste Management, 8 pages, date unknown.
Japanese Office action for Application No. 2011-035221, dated Dec. 22, 2014, 9 pages.
Korean Office action with English Translation for Patent Application No. 10-2014-0010260, dated Feb. 27, 2015, 11 pages.

*Primary Examiner* — Edward Johnson
(74) *Attorney, Agent, or Firm* — Christie, Parker & Hale, LLP (57) ABSTRACT

Disclosed is a method of removing asbestos from an asbestos-containing material by 99% through low temperature heat treatment. The method includes mixing an asbestos-containing material with an oxalic acid at a weight ratio in a range of 1:0.002 to 1:1 and performing heat treatment with respect to a mixture at a temperature of 90° C. to 110° C. to remove asbestos from the asbestos-containing material by 99% or more.

10 Claims, 7 Drawing Sheets

METHOD OF REMOVING ASBESTOS FROM ASBESTOS-CONTAINING MATERIALS BY 99% THROUGH LOW TEMPERATURE HEAT TREATMENT

CROSS-REFERENCE TO RELATED APPLICATION

This application claims priority to Korean Patent Application No. 10-2013-0020445 filed on Feb. 26, 2013, Korean Patent Application No. 10-2013-0031465 filed on Mar. 25, 2013 and Korean Patent Application No. 10-2014-0010260 filed on Jan. 28, 2014 and all the benefits accruing therefrom under 35 U.S.C. §119, the contents of which is incorporated by reference in its entirety.

BACKGROUND OF THE INVENTION

1) Field of the Invention

The present invention relates to a method of removing asbestos from asbestos-containing materials by 99% through low temperature heat treatment.

2) Background of Related Art

Asbestos is one of industrial source minerals utilized in industrial fields, and called with a product name or an ore name. The asbestos is a general product name, and serpentine, olivine or a mineral name is used as the ore name.

The industrial use of asbestos has been recorded since the early 19$^{th}$ century, and it has been known that the asbestos has been regularly mined in Canada, Italy, and the Soviet Union in the end of 19$^{th}$ century. In the early 20$^{th}$ century, the beginning of the use of the asbestos in a brake lining, a clutch, and a gasket of a vehicle rapidly increases the demand for the asbestos. The Second World War diversifies the use of the asbestos, so that millions tons of asbestoses are used to develop North America and reconstruct Europe. Even in Korea, all thatched roofs in farming areas are replaced with slate roofs as a part of Saemaeul movement.

Meanwhile, asbestos minerals are produced in the form of a fibrous assembly, that is, in the form of a bundle. In addition, the asbestos minerals are easily separated from a peripheral dry rock, and split into smaller pieces along a cleavage surface. The fibers represent high tensile force, and have a long length to the extent that the ratio of the minor axis to the major axis is in the range of 20 to 1000. When viewed by using naked eyes of a user, the fibers have the characteristics the same as that of organic fiber such as cellulose, and have flexibility to the extent that thread can be made. Meanwhile, all asbestos minerals are not harmful, and only the asbestos minerals having the fibrous structure are harmful. If a user inhales asbestos dust through a respiratory organ, health problems may be caused. However, even if the user inhales asbestos dust, a disease is not caused unconditionally. It is known that asbestos dust having the length of 5 μm or more, the diameter of 2 μm or less, and the aspect ratio of 5:1 or more is mainly attached to the fine structure of the lung to cause a disease. Although lung cancer appears to a user having a job causing the inhalation of a great amount of asbestos dust or inhaling the asbestos dust for a long time, the disease appears after 20 to 40 years since the user inhales the asbestos dust. Diseases caused by the asbestos include pulmonary asbestosis, lung cancer, celothelioma, and pleural thickening.

Since the asbestos is harmful in an environmental aspect as described above, the asbestos must be safely treated when the asbestos is wasted. Recently, even though most asbestos are buried in a proper place, the burial of the asbestos without the pre-treatment is restricted. Accordingly, since a pre-treatment process is indispensible so that the whole processes are complicated, high cost is increased, and an environmental pollution material after the burial of the asbestos is exposed, a technology of scientifically and safely treating the asbestoses at low cost is required. Especially, Korea designates all acts such as handling and moving of all materials including 1% or more of asbestos as illegal acts in 2011.

Among schemes of treating the asbestos developed until now, there are chemical treatment schemes including a scheme of removing the fibrous structure of the asbestos by treating the surface of the asbestos, and a scheme of melting the asbestos by heating the asbestos at a high temperature. According to the schemes, a bigger problem may be caused by a used solution rather than the harmfulness of the asbestos. In addition, energy may be significantly required, and the treatment cost is greatly required due to the high-temperature heating process. In addition, although the asbestos are removed by about 50% to about 90% according to a conventional scheme, the asbestos are legally restricted in the handling or the movement of the asbestos if at least 1% of asbestos are contained, so that a scheme of removing the asbestos by at least 99% is required.

As a related art of the present invention, there is Korea Unexamined Patent Publication No. 10-2012-0110425 titled "method of asbestos detoxification and calcium compound reaction liquid used therefore" published on Oct. 10, 2012.

SUMMARY OF THE INVENTION

An object of the present invention is to provide a method of detoxifying asbestos or waste slate including the asbestos, which is contained in a serpentine variously used in iron and steel manufacturing industries, by at least 99% through oxalic acid and the low temperature heat treatment in order to overcome the problem of the related art with removing the asbestos partially, for example, by only about 90%.

In addition, conventional schemes such as schemes developed in the United States and Japan are to coat the surface of a material containing the asbestos in order to maintain the present existence state of the asbestos without removing the asbestos, which completely differ from the object of the present invention and a method according to the present invention. In other words, the present invention suggests a method of detoxifying asbestos on site right before the asbestos is moved after a material contained in the asbestos is separated in order to transfer the material contained in the asbestos to another place.

The objects of the present invention are not limited to the above-mentioned objects, and other objects will be clearly understood by those skilled in the art.

In order to accomplish the above object, there is provided a method of removing asbestos from asbestos-containing materials by 99% through low temperature heat treatment. The method includes mixing an asbestos-containing material with an oxalic acid at a weight ratio in a range of 1:0.002 to 1:1 and performing heat treatment with respect to a mixture at a temperature of 90° C. to 110° C., to remove asbestos from the asbestos-containing material by 99% or more.

In this case, the asbestos includes chrysotile.

The asbestos-containing material includes natural serpentine or waste slate.

The natural serpentine is crushed or pulverized.

The natural serpentine or waste slate may be crushed or pulverized regardless of the size of the natural serpentine in order to improve the efficiency in a process of removing the asbestos.

The oxalic acid is diluted in at least one selected from the group consisting of city water, distilled water, and deionized water.

The crushing process may be performed by a Jaw crusher and a Cone crusher, and the pulverizing process is performed by a pulverizer.

As described above, according to the present invention, the fibrous structure of the asbestos included in the asbestos-containing material is decomposed and re-crystallized in the shape of a rhombohedron, thereby removing the toxic property from the asbestos by 99% or more. In addition, since the asbestos can be disposed within a short time at the temperature of 90° C. to 110° C., the harmful asbestos can be treated on site in large quantities.

In addition, an additional process, in which a centrifugal separator or a press filter must be used as a separating unit after a conventional hydrothermal, is not required by using oxalic acid and low temperature heat treatment are used, so that the asbestos can be disposed in large quantities and low disposal cost is required. In addition, since strong acid is not required, the dangerousness resulting from the handling of the strong acid can be removed, so that the environmental pollution can be prevented. Since a neutralization reaction is used, an additional washing process based on alkaline water is not required.

Further, the present invention is applicable to the treatment of serpentine, waste slate, and other asbestos products used in iron and steel manufacturing processes, for example, clothes made of 100% asbestos or high-concentration asbestos such as a liner in a steel mill.

DETAILED DESCRIPTION OF THE INVENTION

Hereinafter, an example embodiment of the present invention will be described in detail with reference to accompanying drawings.

The advantages, the features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

In addition, the details of the generally-known technology that makes the subject matter of the present invention unclear will be omitted in the following description.

The present invention provides a method of removing asbestos from asbestos-containing materials by 99% through low temperature heat treatment, which is characterized in that the asbestos is removed from the asbestos-containing materials by 99% by mixing the asbestos-containing material with oxalic acid at a weight ratio in a range of 1:0.002 to 1:1 and performing heat treatment with respect to a mixture at a temperature of 90° C. to 110° C.

The method removing the asbestos from the asbestos-containing materials by 99% through the low temperature heat treatment is suggested to overcome a regulation to define all acts of handling and moving all materials including at least 1% of asbestos as illegal acts. The fibrous structure of the asbestos included in the serpentine is decomposed and re-crystallized in the shape of a rhombohedron, thereby removing the toxic property form the asbestos by 99%. In addition, since the serpentine is detoxified within a short time at the temperature of 90° C. to 110° C., the harmful asbestos can be treated in large quantities. Therefore, disposal facilities are loaded on a movable vehicle, so that the asbestos can be completely detoxified in a simple manner on site. In addition, an additional process, in which a centrifugal separator or a press filter must be used as a separating unit after a conventional hydrothermal, is not required by using organic acid and low temperature heat treatment are used, so that asbestos can be disposed in large quantities and low disposal cost is required. In addition, since strong acid is not required, the dangerousness resulting from the handling of the strong acid can be removed, so that the environmental pollution can be prevented. Since a neutralization reaction is used, an additional washing process based on alkaline water is not required. Further, the method removing the asbestos from the asbestos-containing materials by 99% through oxalic acid and the low temperature heat treatment is applicable to the treatment of serpentine, waste slate, and other asbestos products used in iron and steel manufacturing processes, for example, clothes made of 100% asbestos or high-concentration asbestos such as a liner in a steel mill.

Figure 1:
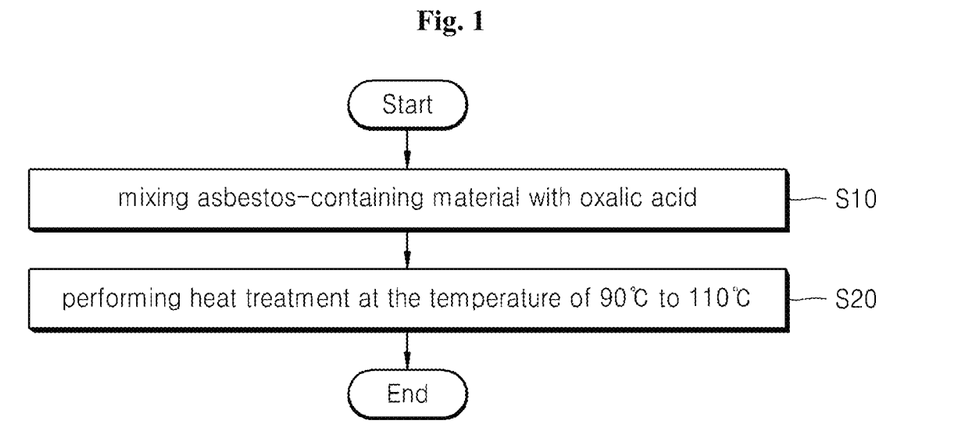
FIG. 1 is a flowchart showing a method of removing asbestos from asbestos-containing materials by 99% through low temperature heat treatment according to an example embodiment of the present invention.

FIG. 1 is a flowchart showing a method of removing asbestos from asbestos-containing materials by 99% through low temperature heat treatment according to an example embodiment of the present invention. Hereinafter, the present invention will be described in detail with reference to FIG. 1.

The method of removing asbestos from the asbestos-containing materials by 99% through the low temperature heat treatment according to the present invention includes a step (S10) of mixing asbestos-containing material with oxalic acid.

In this case, the asbestos-containing material may include natural serpentine. The serpentine may include asbestos, in detail, chrysolite, and the content of asbestos contained in the serpentine may be in the range of 1 to 100% by weight.

Although the size of the mass natural serpentine is not considered, the mass natural serpentine may be crushed or pulverized in the size of 0.1 mm to 30 mm for process efficiency. The natural serpentine may be crushed by a Jaw crusher or a Cone crusher, and may be pulverized by using a pulverizer. Although the natural serpentine may be crushed and pulverized in the size of 0.1 mm or less, pulverizing equipment to pulverize the natural serpentine in the size of 0.1 mm or less may not be prepared. In addition, since the process time is significantly required in the crushing and pulverizing process, the process cost is greatly increased. Accordingly, the size of the natural serpentine is preferably 0.1 mm or more. If the size of the natural serpentine exceeds 30 mm, the serpentine must be additionally pulverized in the subsequent iron manufacturing process. The size of the natural serpentine is preferably 30 mm.

In addition, the asbestos-containing material may include waste slate. Although asbestos exists on the surface of the waste slate, asbestoses are not distributed in uniform contents, and the content of the asbestos included in the waste slate may be generally in the range of 10% by weight to 25% by weight.

In addition, through the method removing the asbestos from the asbestos-containing materials by 99% through the low temperature heat treatment, clothes, foots, or a liner in a steel mill made of 100% asbestos can be detoxified.

When the asbestos-containing material includes waste slate, although the asbestos included in the waste slate can be removed without crushing or pulverizing the waste slate, such as a roof material, in a large volume, the transfer efficiency or the detoxification efficiency of the asbestos included in the waste slate can be improved by crushing and pulverizing the asbestos, which is included in the waste slate, in a small volume of 1×1 mm² to 1×1 m². The crushing process and the pulverizing process of the waste slate may be preformed identically to the crushing process and the pulverizing process of the serpentine. If the crushed and pulverized waste slate has the size of less than 1×1 mm², the particle size of the waste slate may be reduced, so that the asbestos may be exposed to the outside in the form of dust, or the excess of oxalic acid may be required for surface treatment. If the quantity of oxalic acid exceeds 1×1 m², the waste slate may not be easily transferred, and the size of the reaction vessel may be increased for the reaction with the oxalic acid.

In this case, the oxalic acid can easily derive the chelation reaction in the subsequent low temperature heat treatment due to high reactivity and a melting point.

In addition, the crushed and pulverized serpentine and the oxalic acid are preferably mixed with each other at the weight ratio of 1:0.002 to 1. The mixture ratio between the asbestos containing material and the oxalic acid can be calculated through Equation 1 by calculating a specific surface area.

$$\text{Average particle size} = [6/(\text{specific surface area}) \times \text{specific gravity}) \times 1000] \quad \text{Equation 1}$$

In this case, the units of the specific surface area, the particle size, and the specific gravity are m²/g, nm, and g/cm³ respectively.

Therefore, the specific surface area is calculated through [6/(average particle size×specific gravity)×1000], and the crushed and pulverized serpentine having the size of 325 mesh (40 micron), 200 mesh (75 micron), 2 mm, 3 mm, or 5 mm is 0.06 m²/g, 0.032 m²/g, 0.0012 m²/g, 0.0008 m²/g, or 0.00048 m²/g, respectively.

However, the waste slate having a plate shape may have various sizes. For example, a small waste slate may have the size of about 60 cm×30 cm×1 cm, a large waste slate may have the size of about 200 cm×90 cm×1 cm, and a roof material may have the size of about 200 cm×100 cm×1.5 cm, but the waste slate typically has the size of about 180 cm×90 cm×1 cm. Following table 1 shows the calculated specific surface area of the waste slates having the plate shape.

TABLE 1

| Examples | Size (cm) | Specific Gravity | Weight (Kg) | Specific Surface Area (m²/g) |
|---|---|---|---|---|
| Small plate | 60 × 30 × 1 | 2.5 | 4.5 | 0.000084 |
| Large plate | 200 × 90 × 1 | 2.5 | 45 | 0.000081 |
| Roof material | 200 × 100 × 1.5 | 2.5 | 75 | 0.000054 |
| Average roof material | 18 × 90 × 1 | 2.5 | 40 | 0.000081 |

As shown in table 1, the specific surface area may not be greatly varied depending on the variation in the size of the waste slate having the plate shape.

For example, on the assumption that an average particle size is 1 based on 325 meshes (40 micron), if oxalic acid is introduced by a nonstoichiometric quantity, the serpentine and the oxalic acid are mixed with each other at the weight ratio of 1:1.4 for the reaction therebetween. If 1400 g of oxalic acid is required per 1000 g of serpentine, 5 mm serpentine may be detoxified by introducing only 10 g of oxalic acid. The introduction amount of oxalic acid is set on the assumption that the whole surface of the 5 mm serpentine includes asbestos. Actually, the serpentine may be detoxified by using a smaller amount of oxalic acid. If the weight ratio of the serpentine, which is an asbestos-containing material, to the oxalic acid is 1:0.002 or less, the asbestos may not be detoxified completely. If the weight ratio of the serpentine to the oxalic acid exceeds 1:1, an excess of oxalic acid is used in terms of process efficiency, which is ineffective in an economic aspect.

When the asbestos contained in the serpentine, which is an asbestos-containing material, makes a reaction to the oxalic acid, the oxalic acid may be in a dry condition or may be diluted in at least one selected from the group consisting of city water, distilled water, and deionized water for the use of the oxalic acid. If the oxalic acid is used in the dry condition, the oxalic acid may not be uniformly mixed with the asbestos-containing material. However, if the oxalic acid is dissolved in the city water, the distilled water or the deionized water for the use of the oxalic acid, the oxalic acid may be uniformly mixed with the asbestos-containing material and applied to it, and may make a selective reaction to the oxalic acid. Accordingly, the oxalic acid is preferably diluted in at least one selected from the group consisting of city water, distilled water, and deionized water for the use of the oxalic acid.

The method of removing the asbestos from the asbestos-containing materials by 99% through the low temperature heat treatment includes a step (S20) of performing heat treatment at the temperature of 90° C. to 110° C.

In addition, the low temperature heat treatment may be performed at the temperature of 90° C. to 110° C. for 30 minutes. Even if the heat treatment may be performed at the temperature of 50° C., three or four dates are spent for the heat treatment, which makes it difficult to perform the heat treatment on site. If the temperature in the heat treatment exceeds 110° C., an excess amount of energy is consumed in heating, so that the process cost is increased.

If the asbestos-containing material is mixed with the oxalic acid, the reaction is made as expressed through Formula 1. The asbestos contained in the serpentine, which is the asbestos-containing material makes a chelate reaction in which magnesium oxalate. While the magnesium oxalate is formed, a neutralization reaction occurs to generate a silicon dioxide and water. In this case, the magnesium oxalate having the shape of a square column in a hexahedron structure is different from the structure of fibrous asbestos.

$$Mg_3Si_2O_5(OH)_4 + 3C_2H_2O_4 = 3MgC_2O_4 + 2SiO_2 + 10H_2O \quad \text{[Formula 1]}$$

Embodiment 1

Removal of Asbestos from Asbestos-Containing Material

The serpentine raw ore is crushed and pulverized to the size of about 3 mm to about 5 mm.

Figure 2:
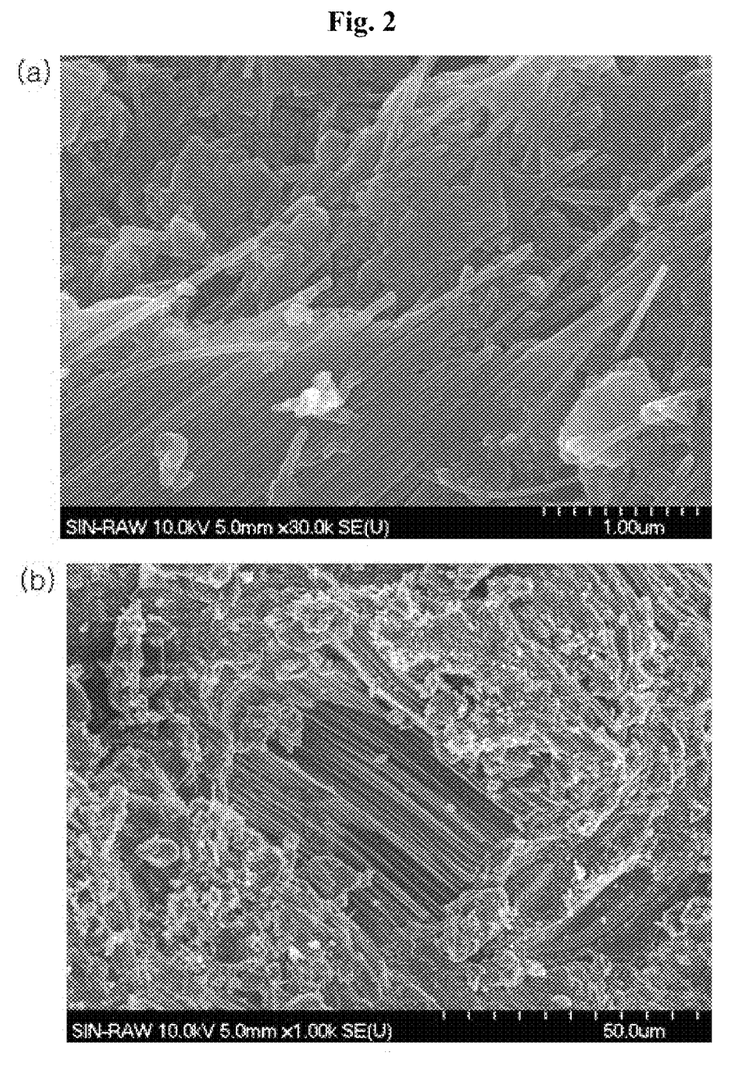
FIG. 2 is an SEM photograph of a natural serpentine.

FIG. 2 is an SEM photography showing the serpentine raw ore. The photography shown in FIG. 2(a) is obtained by enlarging the photography shown in FIG. 2(b) at high magnifications.

After a solution, in which 20 g of oxalic acid ($C_2H_2O_4 \cdot 2H_2O$) was dissolved in 100 cc of distilled water, and 20 g of serpentine were put into an alumina reaction vessel, the alumina reaction vessel was provided into an electric furnace heated at 100° C. and the low temperature heat treatment was performed with respect to the alumina reaction vessel for about 30 minutes, thereby removing asbestos from serpentine.

Embodiment 2

Removal of Asbestos from Serpentine

According to the second embodiment, the serpentine was detoxified in the same manner as that of the first embodiment except for the use of a solution in which 6.5 g of oxalic acid is dissolved.

Embodiment 3

Removal of Asbestos from Serpentine

According to the third embodiment, the serpentine was detoxified in the same manner as that of the first embodiment except for the use of a solution in which 1 g of oxalic acid is dissolved.

Embodiment 4

Removal of Asbestos from Waste Slate

The waste slate plate was crushed and wet-pulverized in size of about 4 mm to 5 mm, and an amount of the asbestos contained in the crushed and pulverized waste slate was measured by a microscope. The amount of the asbestos contained in the waste slate was about 13% based on the waste slate. The specific surface area of the crushed and pulverized waste slate was measured. Then, after mixing 20 g of the crushed and pulverized waste slate with the solution in which 20 g of oxalic acid was dissolved, the result was put into an alumina reaction vessel and heat treatment was performed with respect to the result at the temperature of 100° C. for 30 minutes, thereby removing the waste slate.

Embodiment 5

Removal of Asbestos from Waste Slate

According to the fifth embodiment, the waste slate was detoxified in the same manner as that of the fourth embodiment except that 20 g of waste slate was mixed with the solution in which 2 g of oxalic acid was dissolved.

Embodiment 6

Removal of Asbestos from Waste Slate

According to the sixth embodiment, the waste slate was detoxified in the same manner as that of the fourth embodiment except that 5 g of waste slate was mixed with the solution in which 2 g of oxalic acid was dissolved.

Embodiment 7

Removal of Asbestos from Waste Slate

According to the seventh embodiment, the waste slate was detoxified in the same manner as that of the fourth embodiment except that 4500 g of waste slate was mixed with the solution in which 45 g of oxalic acid was dissolved.

Embodiment 8

Removal of Asbestos from Waste Slate

According to the eighth embodiment, the waste slate was detoxified in the same manner as that of the fourth embodiment except that 4500 g of waste slate was mixed with the solution in which 9 g of oxalic acid was dissolved.

Comparative Example 1

The waste slate plate was crushed and wet-pulverized in size of about 4 mm to 5 mm, and an amount of the asbestos contained in the crushed and pulverized waste slate was measured by a microscope. The amount of the asbestos contained in the waste slate was about 13% based on the waste slate. The specific surface area of the crushed and pulverized waste slate was measured. Then, after mixing 4500 g of the crushed and pulverized waste slate with the solution in which 5850 g of oxalic acid was dissolved, the result was put into an alumina reaction vessel and heat treatment was performed with respect to the result at the temperature of 100° C. for 30 minutes, thereby detoxifying the waste slate.

Comparative Example 2

According to the second comparative example, the waste slate is treated in the same manner as that of the first comparative example 1 except that 20 g of waste slate is mixed with 26 g of oxalic acid and the mixture is subject to the heat treatment at the temperature of 85° C.

Experimental Example 1

Analysis of Asbestos Content Before and After Treatment of Serpentine

Figure 3:
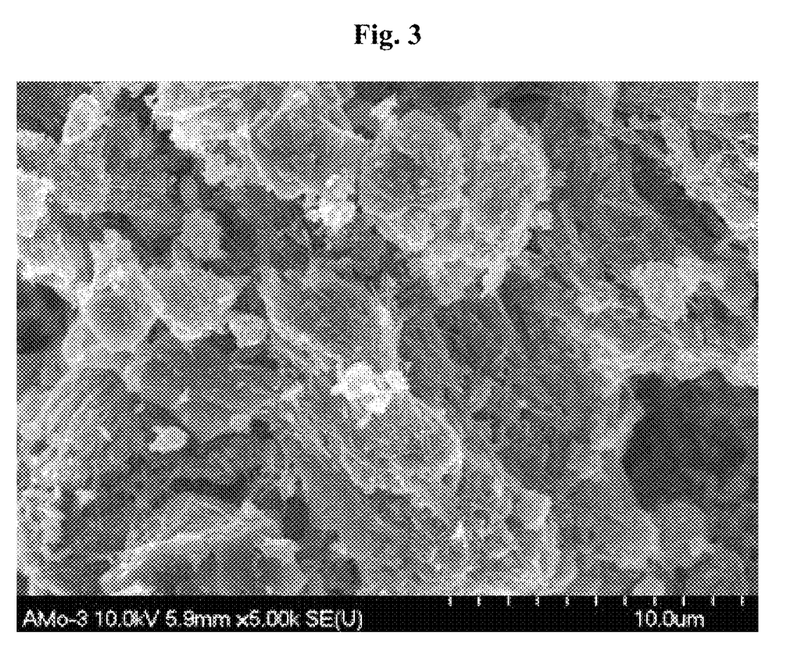
FIGS. 3 and 4 are SEM photographs of a serpentine subject to the method of removing asbestos from asbestos-containing materials by 99% through low temperature heat treatment according to the present invention.
Figure 4:
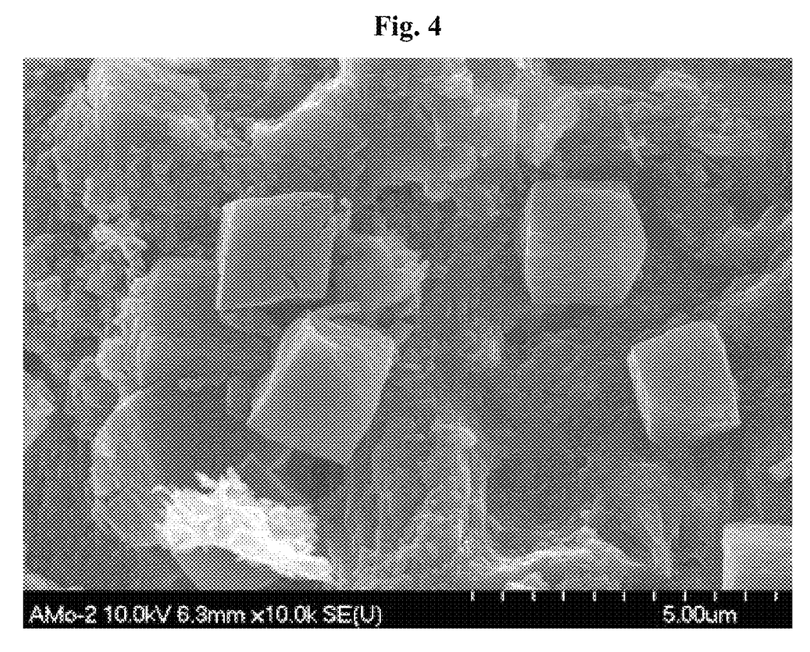

In order to find out the content of the asbestos according to embodiments 1 to 3, which is subject to the method of removing the asbestos from the asbestos-containing materials by 99% through the low temperature heat treatment, the content of the asbestos is analyzed by using a scanning electron microscope (SEM) and the analysis results are shown in FIGS. 3 and 4.

The content of asbestos contained in the serpentine is about 3% before the asbestos is removed from the serpentine. In the case of the first embodiment, since no asbestos is observed from the serpentine according to the present invention, the asbestos is removed from the asbestos-containing material by 99% or more, and the most portion of the asbestos is changed to magnesium oxalate having a rhombohedron structure. In the case of the second embodiment, since no asbestos is observed from the serpentine after the asbestos has been removed from the asbestos-containing material, the asbestos is removed from the asbestos-containing material by 99% or more. In the case of the third embodiment, since about 0.05% by weight of the asbestos is observed from the serpentine after the asbestos has been removed from the asbestos-containing material, the asbestos is removed from the asbestos-containing material by 99% or more.

FIGS. 3 and 4 are SEM photographs of the serpentine subject to the method of removing the asbestos from the asbestos-containing materials by 99% according to the present invention.

As shown in FIGS. 3 and 4, the rhombohedral magnesium oxalate was formed in the serpentine through the method of removing the asbestos according to the present invention.

Experimental Example 2

Content Analysis of Asbestos Before and After Waste Slate

Figure 5:
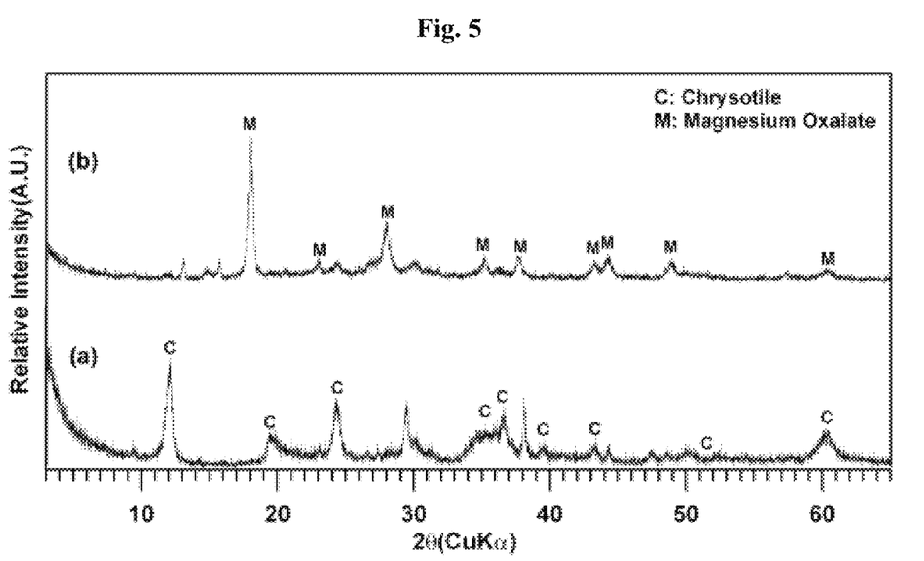
FIG. 5 is a graph showing an X-ray diffraction result before and after waste slate is treated through the method of removing asbestos from asbestos-containing materials by 99% through low temperature heat treatment according to the present invention.
Figure 6:
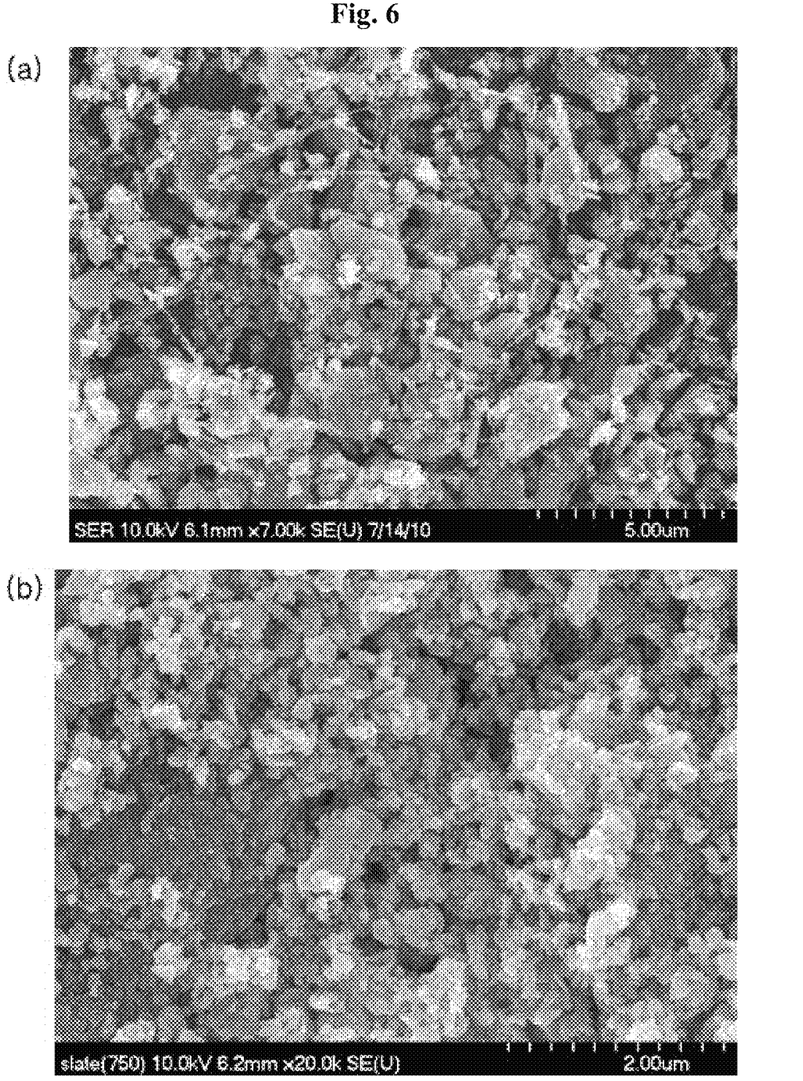
FIG. 6 is an SEM photograph showing waste slate before and after the waste slate is treated through the method of removing asbestos from asbestos-containing materials by 99% through low temperature heat treatment according to the present invention.
Figure 7:
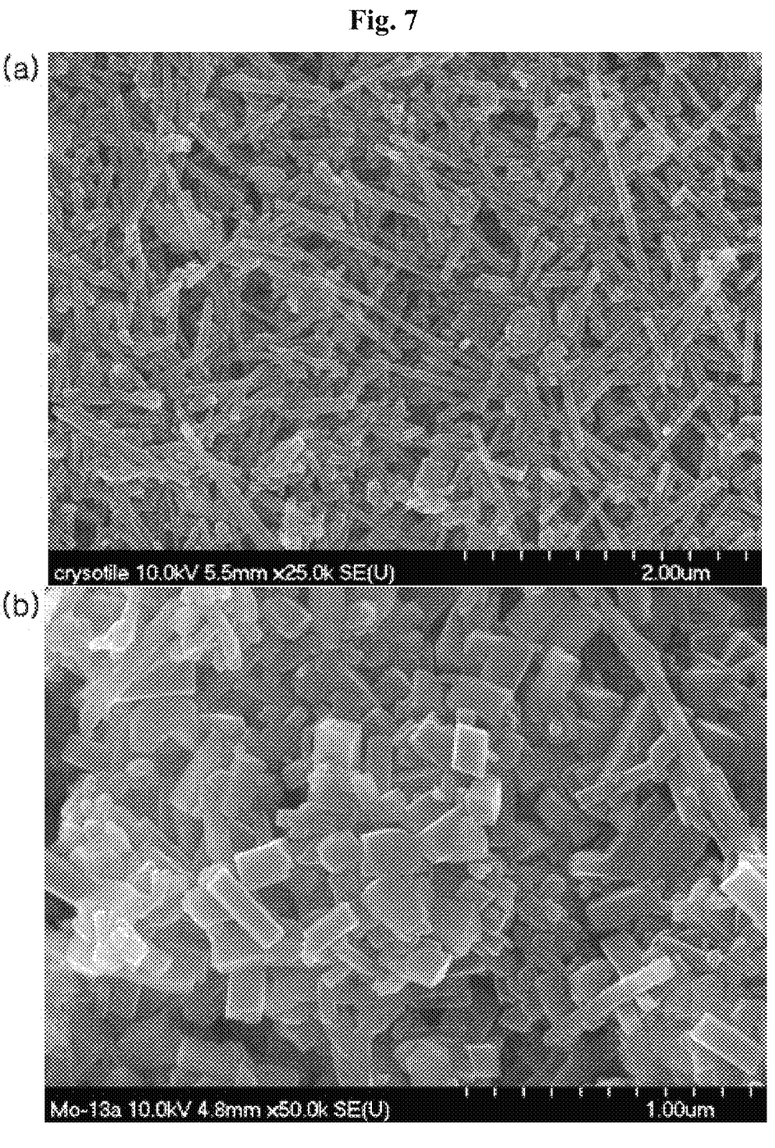
FIG. 7 is an SEM photograph showing waste slate before and after a material including 100% of asbestos is treated through the method of removing asbestos from asbestos-containing materials by 99% through low temperature heat treatment according to the present invention.

In order to find out the content of the asbestos according to embodiments 4 to 8, which is subject to the method of removing the asbestos from the asbestos-containing materials by 99% or more through the low temperature heat treatment, the content of the asbestos is analyzed by an X-ray diffraction and a scanning electron microscope (SEM), and the results are shown in FIGS. 5, 6, and 7.

The content of asbestos contained in the waste slate is about 13% by weight before the asbestos is removed from an asbestos-containing material. In the case of the fourth embodiment, since about 0.01% by weight of the asbestos is observed from the surface of the waste slate after the asbestos has been removed from the asbestos-containing material, the asbestos is removed from the asbestos-containing material by 99.9%, and the most portion of the asbestos is changed to magnesium oxalate having a rhombohedron structure. In the case of the fifth embodiment, since about 0.1% or less by weight of the asbestos is observed from the surface of the waste slate after the asbestos has been removed from the asbestos-containing material, the asbestos is removed from the asbestos-containing material by 99% or more. In the case of the sixth embodiment, since about 0.09% or less by weight of the asbestos is observed from the surface of the waste slate after the asbestos has been removed from the asbestos-containing material, the asbestos is removed from the asbestos-containing material by 99 or more %. In the case of the seventh embodiment, since about 0.1% or less by weight of the asbestos is observed from the surface of the waste slate after the asbestos has been removed from the asbestos-containing material, the asbestos is removed from the asbestos-containing material by 99% or more. In the case of the eighth embodiment, since about 0.1% or less by weight of the asbestos is observed, the asbestos is removed from the asbestos-containing material by 99% or more.

FIG. 5 is a graph showing an X-ray diffraction result before and after waste slate is treated through the method of removing asbestos from asbestos-containing materials by 99% through low temperature heat treatment according to the present invention. As shown in FIG. 5, although chrysotile, which serves as a main component of calcite and the asbestos, is shown in the waste slate before the asbestos is removed (see FIG. 5(a)), magnesium oxalate is shown from the waste slate, which is treated through the method of removing asbestos from asbestos-containing materials by 99% through low temperature heat treatment according to the embodiment, through the X-ray diffraction analysis (see FIG. 5(b)).

FIG. 6 is an SEM photograph showing waste slate before and after the waste slate is treated through the method of removing asbestos from asbestos-containing materials by 99% through low temperature heat treatment according to the present invention. As shown in FIG. 6, although fibrous asbestos exists on the surface of the waste plate (see FIG. 6(a)), the fibrous asbestos is not found on the waste slate treated through the method of removing asbestos from asbestos-containing materials by 99% through low temperature heat treatment according to the present invention (see FIG. 6(b)).

FIG. 7 is an SEM photograph showing waste slate before and after a material including 100% of asbestos is treated through the method of removing asbestos from asbestos-containing materials by 99% through low temperature heat treatment according to the present invention. As shown in FIG. 7, although the most portions of asbestos has a fibrous structure (see FIG. 7(a)), asbestos, which is treated through the method of removing asbestos from asbestos-containing materials by 99% through low temperature heat treatment according to the present invention, has no fibrous structure (see FIG. 7(b)).

Following table 2 shows that amounts of serpentine, waste slate, and oxalic acid, the temperature and time in the low temperature heat treatment, and the removal rate of asbestos according to the first to eighth embodiments.

TABLE 2

| Embodiments | Waste Slate (g) | Oxalic acid (g) | weight ratio | temperature (° C.) | time (min) | Removal rate of asbestos (%) (%) |
|---|---|---|---|---|---|---|
| Embodiment 1 | 20 | 20 | 1:1 | 100 | 30 | 99 or more |
| Embodiment 2 | 20 | 6.5 | 1:0.325 | 100 | 30 | 99 or more |
| Embodiment 3 | 20 | 1 | 1:0.05 | 100 | 30 | 99 or more |
| Embodiment 4 | 20 | 20 | 1:1 | 100 | 30 | 99 or more |
| Embodiment 5 | 20 | 2 | 1:0.1 | 100 | 30 | 99 or more |
| Embodiment 6 | 5 | 2 | 1:0.4 | 100 | 30 | 99 or more |
| Embodiment 7 | 4500 | 45 | 1:0.01 | 100 | 30 | 99 or more |
| Embodiment 8 | 4500 | 9 | 1:0.002 | 100 | 30 | 99 or more |
| Comparative Example 1 | 4500 | 5850 | 1:1.3 | 100 | 30 | about 95% |
| Comparative Example 2 | 20 | 26 | 1:1.3 | 85 | 30 | about 90% |

Although the method of removing asbestos from asbestos-containing materials by 99% through low temperature heat treatment has been described, it is obvious that various variations and modifications are possible without departing from the scope of the present invention.

Although exemplary embodiments of the present invention have been described for the illustrative purpose, it is understood that the present invention should not be limited to these exemplary embodiments but various changes, modifications, equivalents can be made by one ordinary skilled in the art within the spirit and scope of the present invention as hereinafter claimed.

What is claimed is:

1. A method of removing asbestos from an asbestos-containing material by 99% through low temperature heat treatment, the method comprising:
    mixing an asbestos-containing material with an oxalic acid at a weight ratio in a range of 1:0.002 to 1:1, and performing heat treatment with respect to a mixture at a temperature of 90° C. to 110° C. to remove asbestos from the asbestos-containing material by 99% or more.

2. The method of claim 1, wherein the asbestos-containing material comprises natural serpentine or waste slate.

3. The method of claim 2, wherein the natural serpentine is crushed or pulverized.

4. The method of claim 3, wherein the crushed or pulverized natural serpentine has a size in a range of 0.1 mm to 30 mm.

5. The method of claim 2, wherein the waste slate has a specific surface area in a range of 0.00048 $m^2$/g to 0.06 $m^2$/g.

6. The method of claim 2, wherein the waste slate is crushed or pulverized.

7. The method of claim 6, wherein the crushed or pulverized waste slate has a size in a range of 1×1 $m^2$ to 1×1 $m^2$.

8. The method of claim 1, wherein the oxalic acid is diluted in at least one selected from the group consisting of city water, distilled water, and deionized water.

9. The method of claim 3, wherein the crushing process is performed by a Jaw crusher and a Cone crusher, and the pulverizing process is performed by a pulverizer.

10. The method of claim 6, wherein the crushing process is performed by a Jaw crusher and a Cone crusher, and the pulverizing process is performed by a pulverizer.

* * * * *